(12) United States Patent
Gardarin

(10) Patent No.: US 9,902,210 B2
(45) Date of Patent: Feb. 27, 2018

(54) TYRE FOR A ROAD VEHICLE, COMPRISING FINS

(75) Inventor: Benoît Gardarin, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 500 days.

(21) Appl. No.: 14/344,831

(22) PCT Filed: Sep. 14, 2012

(86) PCT No.: PCT/FR2012/052067
§ 371 (c)(1),
(2), (4) Date: Mar. 24, 2014

(87) PCT Pub. No.: WO2013/038115
PCT Pub. Date: Mar. 21, 2013

(65) Prior Publication Data
US 2014/0246137 A1    Sep. 4, 2014

(30) Foreign Application Priority Data
Sep. 15, 2011 (FR) .................................... 11 58236

(51) Int. Cl.
*B60C 13/00*    (2006.01)
*B60C 13/02*    (2006.01)
(Continued)

(52) U.S. Cl.
CPC ............ *B60C 13/02* (2013.01); *B60C 15/024* (2013.01); *B60C 15/0242* (2013.01)

(58) Field of Classification Search
CPC ....... B60C 13/00; B60C 13/02; B60C 13/023; B60C 15/00; B60C 15/024; B60C 15/0242
See application file for complete search history.

(56) References Cited

U.S. PATENT DOCUMENTS

| 3,942,370 A * | 3/1976 | Grosch .................. G01M 17/02 73/146 |
| 2004/0065771 A1 | 4/2004 | Snyder ............................. 244/10 |
| 2012/0085473 A1 | 4/2012 | Matsuo et al. ................. 152/523 |

FOREIGN PATENT DOCUMENTS

| CA | 2 578 641 A1 | 8/2008 |
| EP | 1 834 812 A1 | 9/2007 |

(Continued)

OTHER PUBLICATIONS

Machine translation of EP 208807, 2009.*

*Primary Examiner* — Justin R Fischer
(74) *Attorney, Agent, or Firm* — Fitzpatrick, Cella, Harper & Scinto

(57) ABSTRACT

A tire for a road vehicle is configured to have a predetermined direction of rotation. The tire includes fins for modifying the vehicle's drag and/or lift. The fins are arranged on a sidewall of the tire and form an angle $\alpha$ in a projection plane perpendicular to an axis X of the tire, with the angle $\alpha$ belonging to a domain $[-3\pi/8, -\pi/12]$ or a domain $[0, +3\pi/8]$. Each fin extends within a range $]D_m, D_M[$ of distances from the axis X of the tire. A height of each fin varies continuously as a function of a distance from the axis X of the tire, with every point of maximum height of the fin being at a distance from the axis X of the tire that is less than or equal to $D_m + 0.40 (D_M - D_m)$.

23 Claims, 5 Drawing Sheets

(51) Int. Cl.
*B60C 15/00* (2006.01)
*B60C 15/024* (2006.01)

(56) References Cited

FOREIGN PATENT DOCUMENTS

| | | | |
|---|---|---|---|
| EP | 1925468 | * | 5/2008 |
| EP | 2088007 | * | 8/2009 |
| EP | 2 236 319 A1 | | 10/2010 |
| FR | 2 848 174 A1 | | 6/2004 |
| JP | H08-034206 A | | 2/1996 |
| JP | 2001-039129 A | | 2/2001 |
| JP | 2004-291938 | * | 10/2004 |
| WO | WO 2006/130944 A1 | | 12/2006 |
| WO | WO 2009/017167 A1 | | 2/2009 |
| WO | WO 2010/126144 A1 | | 11/2010 |

\* cited by examiner

TYRE FOR A ROAD VEHICLE, COMPRISING FINS

FIELD OF THE INVENTION

The present invention relates to a tyre fitted with fins. It is applicable, notably, to tyres for road vehicles of all types, notably private vehicles, motorcycles or heavy goods vehicles, but is not limited thereto.

RELATED ART

FR 2 848 174 discloses a device for modifying the interactions between an air flow and a road vehicle, in this case for the purpose of reducing the drag coefficient of the vehicle. The device comprises air flow intake means at a wheel housing and means for discharging the intake air towards the rear of the vehicle through a conduit connecting the wheel housing to the rear of the vehicle.

However, a device of this type requires a specific arrangement of the air intake and discharge means within the vehicle. This arrangement varies from one vehicle to another. The device is also relatively complex.

BRIEF DESCRIPTION OF EMBODIMENTS OF THE INVENTION

The object of the invention is to enable the interactions between the air flow and the vehicle to be modified in a simpler and more universal manner, and in particular to act on the drag and lift of the vehicle so as to achieve the technical effects desired by the manufacturer or user of the vehicle.

For this purpose, the invention proposes a tyre for a road vehicle, characterized in that it has a predetermined direction of rotation and comprises a plurality of fins, arranged on a sidewall of the tyre, for modifying the drag and/or lift of the vehicle, notably a group G of fins formed by at least 60%, and preferably all, of the fins of this plurality of fins, each fin of this group G of fins having the following characteristics:
   each fin comprises a junction with the sidewall;
   the projection of the junction in a projection plane perpendicular to an axis of revolution of the tyre is substantially rectilinear or substantially curved, and has a radially outer end called the origin;
   the fin is arranged so as to form, in the projection plane, an angle $\alpha$ between:
   a straight line, called the reference line, passing through the axis and the origin, and
   a straight line representing an average tilt of the projection of the junction and passing through the origin;
   the average tilt comprising:
      an average tilt in relation to the inclination of the projection of the junction at the origin, equal to an angle $\alpha 1$ between the reference line and the tangent to the projection of the junction at the origin, and further comprising, in the case in which the projection of the junction is substantially curved:
      an average tilt in relation to the curvature of the projection of the junction, equal to an angle $\alpha 2$ between the tangent to the projection of the junction at the origin and a straight line, called the average line, passing through the origin, the average line and the projection of the junction crossing each other at an intersection point, the projection of the junction comprising a first portion lying between the origin and the intersection point and a second portion lying between the intersection and a radially inner end of the projection of the junction, the average line comprising a first portion lying between the origin and the intersection point and a second portion lying between the intersection point and the orthogonal projection of the radially inner end on the average line, the average line being such that the areas lying between, respectively, the first and the second portions of the projection of the junction and the average line are substantially equal, the angle $\alpha$ being counted positively in the direction of rotation of the tyre, starting from the reference line, the value of the angle $\alpha$ belonging to the predetermined domain formed by the range $[-3\pi/8, -\pi/12]$ and the range $[0, +3\pi/8]$, and preferably to the predetermined domain formed by the range $[-3\pi/8, -\pi/8]$ and the range $[0, +3\pi/8]$;
   the fin extending within a range $]D_m, D_M[$ of distances from the axis (X) of the tyre, the height of the fin varying continuously as a function of the distance from the axis (X) of the tyre, while every point of maximum height of the fin with respect to the sidewall of the tyre is at a distance from the axis of the tyre which is less than or equal to $D_m+0.40(D_M-D_m)$, and preferably less than or equal to $D_m+0.30(D_M-D_m)$.

The fins, which have distinctive characteristics, act as vortex generators. Each fin generates, in its wake, an eddy which locally modifies the air flow around the tyre and causes the air flow around the vehicle to be uniform overall, thus modifying the interactions between the air flow and the vehicle.

The inventors who have devised this invention have discovered that certain interactions between the air flow and the vehicle fitted with tyres according to the invention, characterized by the drag coefficient or the lift coefficient of the vehicle for example, are considerably modified by comparison with the interactions between the air flow and an identical vehicle fitted with tyres which are similar but do not comprise fins, or which comprise fins not having the aforesaid combination of characteristics.

The fins of the tyre according to the invention form passive aerodynamic members which, unlike the prior art devices, consume no energy.

The prior art incorporates documents mentioning fins arranged on the sidewall of a tyre, particularly the patent documents EP 1 834 812, EP 2 236 319, WO 2009/017167, CA 2 578 641, WO 2006/130944, US 2004/126144, and WO 2010/126144. However, the fins described in these documents are intended for purposes other than those of the invention, for example the purposes of increasing the heat exchange between the air and the tyre, removing water present on the road, or eliminating water spray. Some documents also relate to tyres which are structurally very different from those of road vehicles, such as aircraft tyres, the function of the fins being to generate the rotation of these tyres before landing.

These different embodiments of fins do not combine all the technical characteristics required in order to achieve, at least to a satisfactory extent, the aforesaid desired technical effects of the invention.

In the following text, the characteristics of each of the fins of a single group G only will be described, unless specified otherwise, this group advantageously comprising at least 80%, and preferably all, of the fins arranged on the sidewall of the tyre.

Advantageously, for each fin, between a point of the fin located substantially at the maximum distance $D_M$ from the axis of the tyre and at least one point of maximum height of the fin, the height of the fin increases constantly over at least 50% of the range ]$D_m$, $D_M$[ of distances from the axis of the tyre, and preferably over the whole range of distances between this point of the fin located substantially at the maximum distance and this point of maximum height of the fin. Thus the position of the point or points of maximum height of the fin surface is located in the part of the fin which is relatively remote from the tread, and relatively nearer to the axis of the tyre. The air which engages with the length of the fin at the front of the tyre therefore does not directly meet a maximum fin height, but advantageously meets a profile of the free edge of the fin which increases progressively. This is helpful in achieving a progressive channelling of the air flow according to the objects of the invention. However, in order to achieve other objects, for example in order to obtain a high increase in heat transfer, or to remove water from the road, it is possible to devise a different fin profile in which the maximum height is found at the leading edge of the fin.

Conventionally, the height of a fin at a given distance D from the axis (of revolution) X of the tyre is the maximum distance of a point on the surface of this fin from the base surface of the sidewall of the tyre, among the points on the surface of this fin located at the distance D from the axis X.

Preferably, the position of any point of maximum width of the tyre is located at a distance from the axis of the tyre (the axis of revolution) of less than $D_M-0.30(D_M-D_m)$, and preferably less than or equal to $D_m$. Thus the most favourable position of the fin is relatively close to the tread, with a substantial part of the fin, and typically at least 50% or preferably the whole of the fin, being located between the "equatorial" point of maximum width of the tyre and the tread. In fact, it has proved to be desirable for the start of the fin to be at a point relatively close to the tread.

Advantageously, for each fin, the fin does not comprise any point having the same circumferential angular position as any point of another fin located on the sidewall of the tyre, in projection on the projection plane perpendicular to the axis of revolution of the tyre. Thus there is no radial overlap of the fins in projection on a plane perpendicular to the axis of revolution of the tyre. It is therefore possible to use fins which channel relatively wide air flows, and to avoid excessive friction with the air flows by spacing the fins.

Advantageously, the number of fins arranged on the sidewall of the tyre is between 10 and 32, preferably between 10 and 26, and most preferably between 11 and 22 inclusive.

It is also preferable for each fin not to form a cavity. Cavities create relatively large eddies and relatively high friction which are preferably avoided if the best performance is to be achieved.

The tyre is a tyre for a road vehicle, such as a private vehicle, a lorry, or a utility vehicle, for example a van, coach or bus, or a motorcycle. All these vehicles use tyres comprising reinforcing threads suitable for operation in the pressure range from 0.12 MPa to 1.0 MPa, and preferably from 0.12 MPa to 0.5 MPa. They are therefore markedly different from tyres for aircraft which are designed for operating pressures typically greater than or equal to 1.2 MPa.

Preferably, the fins are distributed circumferentially at equal intervals on the sidewall. The phrase "distributed circumferentially at equal intervals" signifies that each fin is located substantially at the same angular distance from the two fins adjacent to it. In other words, every pair of fins distributed at equal intervals has the same angular spacing. The sidewall may be an outer or an inner sidewall of the tyre, taking the direction of rotation of the tyre into account. The fins may be arranged on both sidewalls. Preferably, the fins are all identical.

Optionally, each fin can be deformed by the action of the air flow, and is preferably not hinged.

Advantageously, the tyre comprises a junction between each fin and the sidewall. This junction may be continuous or discontinuous.

Optionally, each fin is made from the same piece of material as the sidewall. In a variant, each fin is applied to the sidewall, by adhesion for example.

In the case of a fin made from the same piece of material as the sidewall, the junction is formed, for example, by the trace left by the fin if the latter is cut off along the outer surface of the sidewall. In the case of a fin applied to the sidewall, the junction is formed, for example, by the trace left, if the fin is removed from the sidewall, by the means used to fix the fin to the sidewall.

In one embodiment, the projection of the junction in a projection plane perpendicular to an axis of revolution of the tyre is substantially curved.

In another embodiment, it is substantially straight.

Advantageously, for each fin (of the group G), the value of the angle ($\alpha$) belongs to the predetermined domain formed by the range $[-3\pi/8, -\pi/12]$ and the range $[+\pi/12, +3\pi/8]$, and preferably to the domain formed by the range $[-3\pi/8, -\pi/8]$ and the range $[+\pi/8, +\pi/4]$.

In an embodiment which serves to reduce the drag coefficient of the vehicle, the predetermined domain is advantageously $[0, 3\pi/8]$ and preferably $[+\pi/12, +3\pi/8]$, and very preferably $[+\pi/8, +\pi/4]$.

In an embodiment which serves to increase the drag coefficient of the vehicle, the predetermined domain is $[-\pi/2, 0[$, preferably $[-3\pi/8, -\pi/8]$, and more preferably $[-\pi/4, -\pi/8]$.

By modifying the drag coefficient it is possible to modify the resistance of the vehicle to forward motion, resulting in a modification of the fuel consumption of the vehicle.

In an embodiment which serves to reduce the lift coefficient of the vehicle, the predetermined domain is $[\pi/8, \pi/2]$, preferably $[\pi/4, \pi/2]$, and more preferably $[3\pi/8, \pi/2]$.

In an embodiment which serves to increase the lift coefficient of the vehicle, the predetermined domain is $[-\pi/2, \pi/8[$, preferably $[-3\pi/8, 0]$, very preferably $[-3\pi/8, -\pi/12]$, and even more preferably $[-\pi/4, -\pi/8]$.

By modifying the lift coefficient it is possible to modify the pressure of the vehicle on the road, whereby the grip of the vehicle on the road can be adjusted.

Advantageously, the tyre bears a mark, for example an arrow, indicating the predetermined direction of rotation.

The invention also proposes a road vehicle comprising at least one tyre mounted on this vehicle, as defined above. Preferably, at least one of the front and rear axles, or both axles, are fitted with these tyres.

The invention further proposes the use of a tyre as defined above for modifying the drag coefficient and/or the lift coefficient of the vehicle.

In one embodiment, the use of the tyre serves to reduce the drag coefficient of the vehicle. In a variant, the use of the tyre serves to increase the drag coefficient of the vehicle.

In one embodiment, the use of the tyre serves to reduce the lift coefficient of the vehicle. In a variant, the use of the tyre serves to increase the lift coefficient of the vehicle.

BRIEF DESCRIPTION OF THE DRAWINGS

The invention will be more clearly understood from the following description which is provided solely by way of non-limiting example, and which refers to the drawings, in which.

DETAILED DESCRIPTION OF EMBODIMENTS OF THE INVENTION

Figure 1:
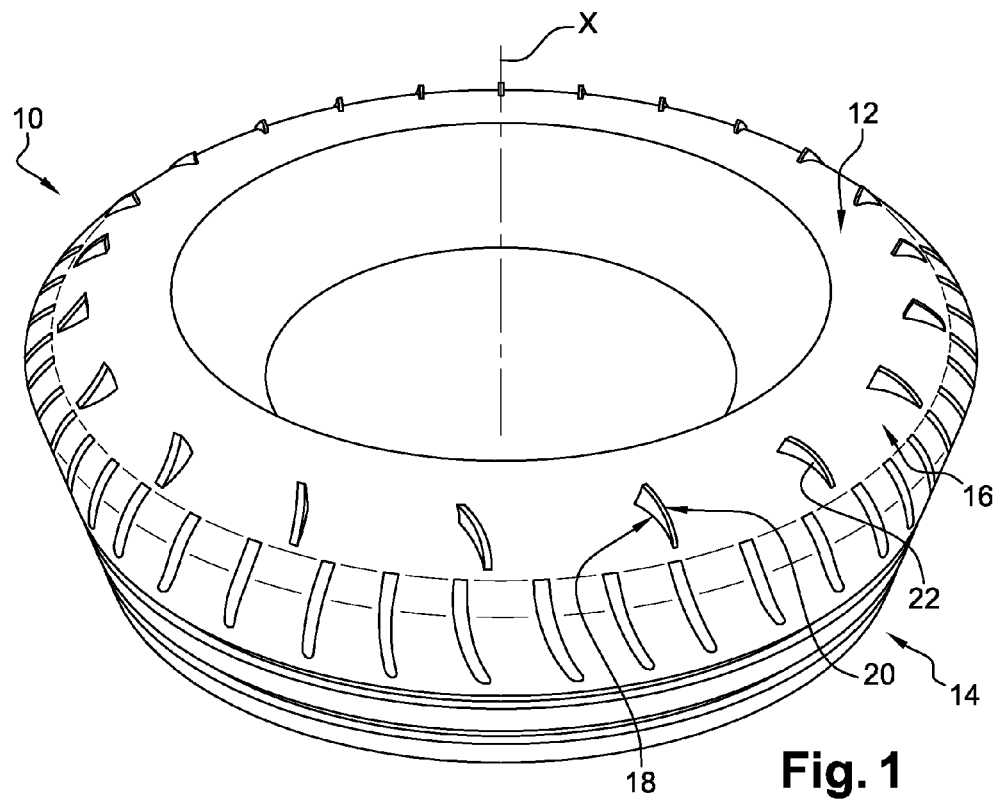
FIG. 1 is a perspective view of a tyre according to a first embodiment of the invention, comprising a sidewall and fins.

FIG. 1 shows a tyre according to a first embodiment, indicated by the general reference 10. The tyre 10 is intended to be mounted on a road vehicle and has a generally toroidal shape of revolution about an axis X. The tyre 10 comprises two sidewalls 12 and a tread 14.

The tyre 10 comprises fins 16, in this case twenty-two fins arranged on one of the sidewalls 12 of the tyre 10 and equally distributed circumferentially on the sidewall 12. Preferably, the fins 16 are arranged on the outer sidewall of the tyre when the latter is mounted on the vehicle. In a variant, the tyre 10 comprises fins arranged on both sidewalls 12.

Each fin 16 comprises a leading face 18 and a face 20 opposite the leading face 18. When the tyre 10 is mounted on the vehicle, the leading face 18 comes into contact with an air flow into which it penetrates as the vehicle advances. The leading face 18 is concave.

Each fin 16 of the tyre 10 of FIG. 1 is applied to the sidewall 12, by adhesion for example. Before being applied to the sidewall 12, the curve of which it matches, each fin 16 has a generally triangular shape whose length L, thickness e and height h satisfy the following conditions: 0.1 H<L<H; e<L; e<h, and L>1.5 h, where H denotes the height of the sidewall 12. In this case, the sidewall 12 has a height H of about 80 mm, and, for each fin 16, e=2 mm, L=30 mm and h=12 mm. The thickness e is substantially constant and separates the leading face 18 from the opposite face 20.

In a variant, each fin 16 has a generally rectangular or trapezoidal shape.

In a variant, each fin 16 is made from the same piece of material as the sidewall 12.

The tyre 10 comprises a junction 22 between each fin 16 and the sidewall 12, in this case a junction line 22.

Figure 2:
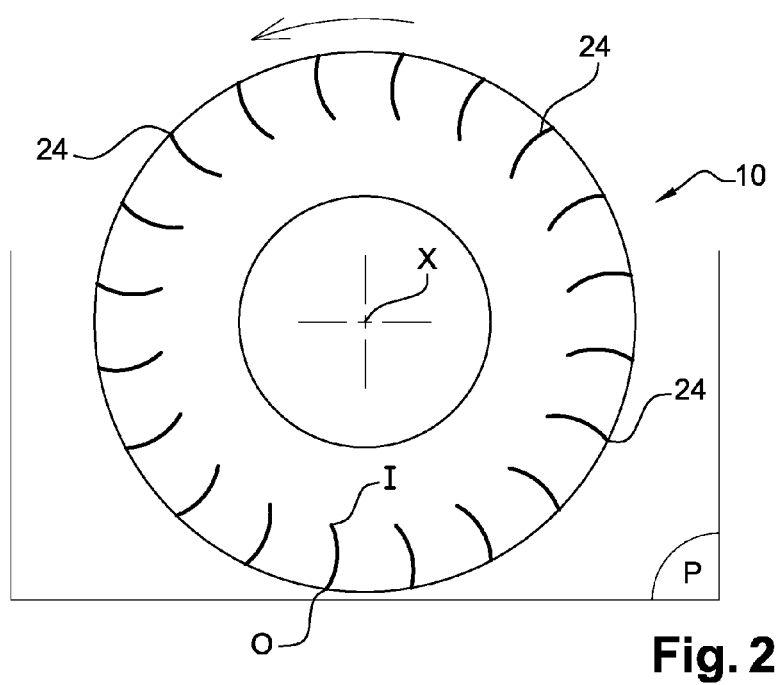
FIG. 2 is a projection of the tyre of FIG. 1 in a projection plane perpendicular to the axis of the tyre, showing projections of junctions between the fins and the sidewall of the tyre.

FIG. 2 shows a sectional view of the tyre 10 in a plane P perpendicular to the axis X shown in FIG. 1. In this case, the plane P is the median plane of the tyre 10. The predetermined direction of rotation of the tyre 10 is also indicated, by an arrow rotating in the anticlockwise direction. FIG. 2 shows the projection 24 of each junction line 22 on the plane P. In this embodiment, the projection 24 of each line 22 is substantially curved.

Each projection 24 has a radially outer end O, called the origin, and a radially inner end I.

Figure 3:
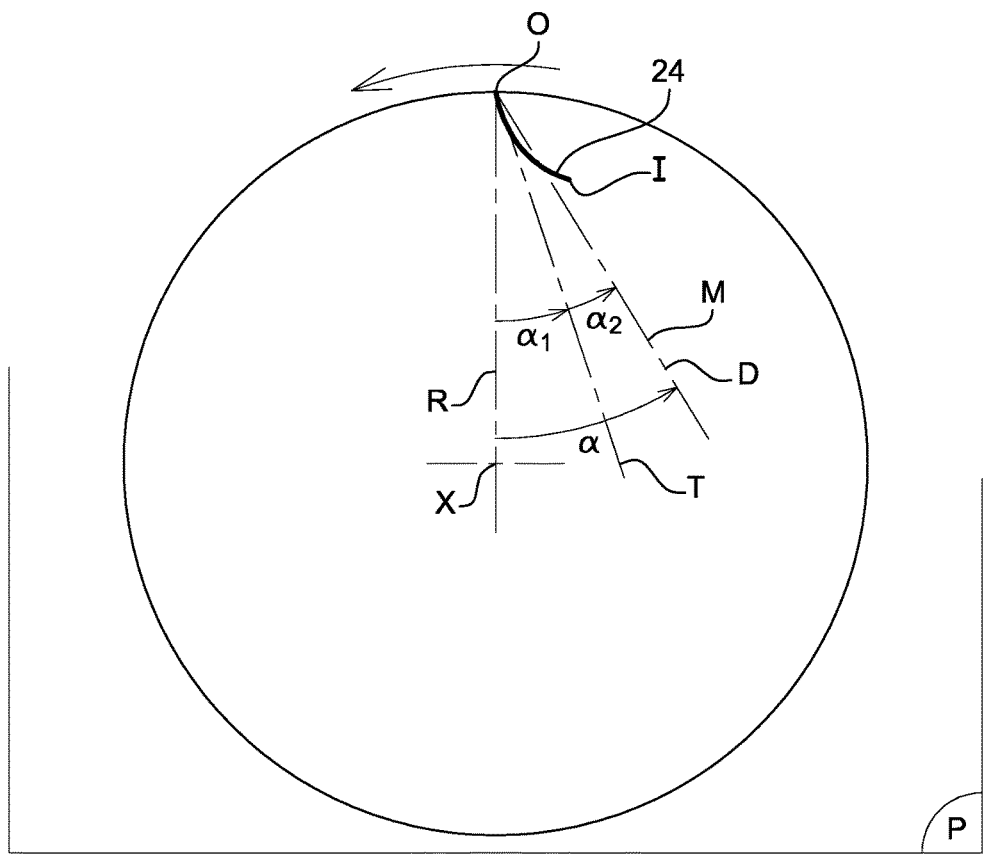
FIG. 3 is a projection of a junction of FIG. 2, showing an average tilt of a projection comprising an average tilt in relation to the inclination of the projection and an average tilt in relation to the curvature of the projection.

With reference to FIG. 3, each fin 16 is arranged so as to form, in the plane P, an angle $\alpha$ between a straight line R, called the reference line, passing through the axis X and the origin O, and a straight line D representing an average tilt of the projection 24 and passing through the origin O.

The average tilt comprises, on the one hand, an average tilt in relation to the inclination of the projection 24 at the origin O, equal to an angle $\alpha 1$ between the reference line R and the tangent T to the projection 24 at the origin O, and, on the other hand, an average tilt in relation to the curvature of the projection 24, equal to an angle $\alpha 2$ between the tangent T to the projection 24 at the origin O and a straight line M, called the average line, passing through the origin O. In this case, the straight lines D and M coincide.

Figure 4:
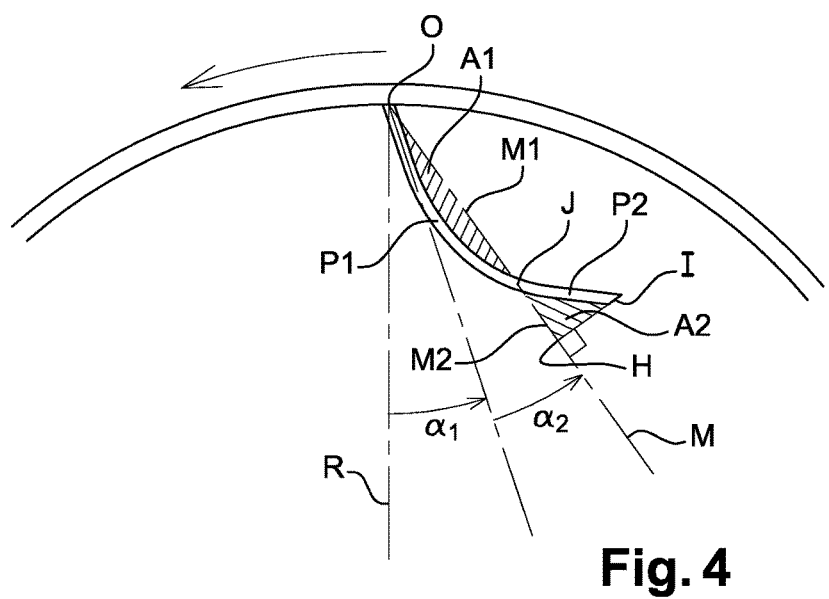
FIG. 4 is a detail view of FIG. 3.

With reference to FIG. 4, the average line M and the projection 24 cross each other at an intersection point J. The projection 24 comprises, on the one hand, a first portion P1 running between the origin O and the intersection point J, and, on the other hand, a second portion P2 running between the intersection J and the end I.

The average line M comprises a first portion M1 running between the origin O and the intersection point J and a second portion M2 running between the intersection point J and the orthogonal projection H of the end I on the average line M.

The average line M is such that the area A1 between the first portion P1 of the projection 24 and the first portion M1 of the average line M is substantially equal to the area A2 between the second portion P2 of the projection 24 and the second portion M2 of the average line M.

Figure 5:
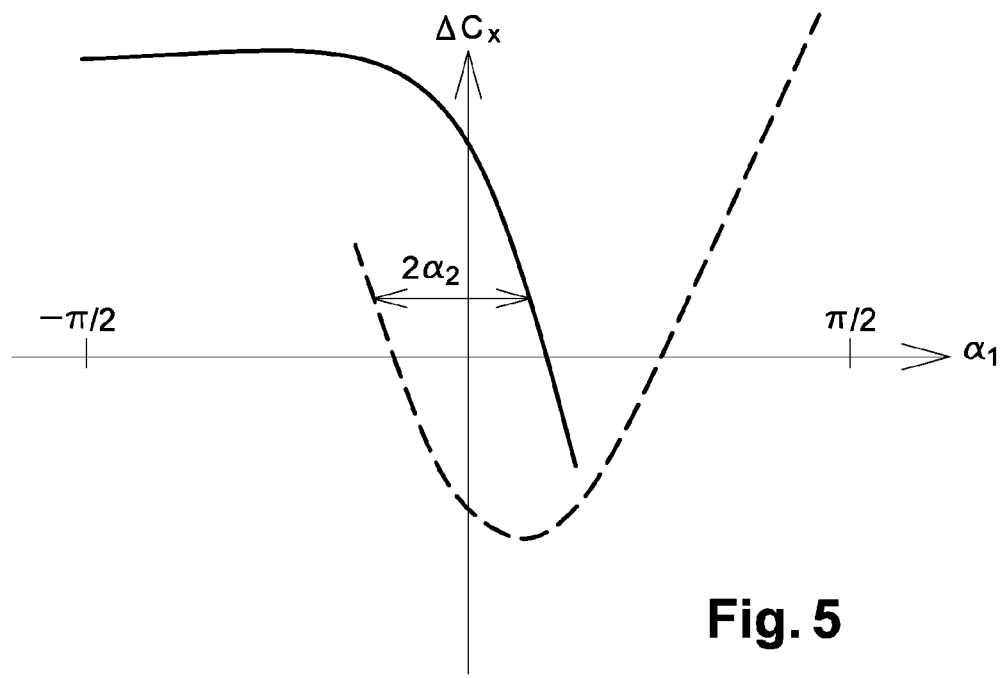
FIG. 5 shows curves for the determination of the average tilt in relation to the curvature of the projection.

A method for determining the angle $\alpha 2$ corresponding to the average tilt in relation to the curvature of each projection 24 will now be described, with reference to FIG. 5.

A series of tyres Pi for a road vehicle is manufactured. The fins 16 of all the tyres Pi have an identical average tilt in relation to the curvature. The fins 16 of each tyre Pi have an average tilt in relation to the inclination which varies according to the tyre Pi. Thus, each tyre Pi is characterized by a pair of angles $\{\alpha 1, i; \alpha 2\}$ corresponding, respectively, to the average tilt in relation to inclination and the average tilt in relation to curvature.

In a first series of measurements, each tyre Pi is mounted on a road vehicle in such a way that its direction of rotation is maintained, and the drag coefficient Cx of the vehicle is measured. All the wheels are fitted with the same tyre Pi. The average tilt of each fin of each tyre Pi in this first series of measurements is equal to an angle $\alpha A$ such that $\alpha A=\alpha 1,i+\alpha 2$. Similarly, the drag coefficient Cx,0 is measured on the same vehicle fitted with a similar tyre having no fins. For each tyre Pi, this gives us the difference $\Delta Cx=Cx-Cx,0$, that is to say the gain in drag coefficient. From this it is possible to deduce the variation of the gain in drag coefficient as a function of the angle $\alpha 1$ (the continuous curve).

In a second series of measurements, each tyre Pi is mounted on the same road vehicle in such a way that its direction of rotation is reversed. In the present case, the side of the vehicle on which the tyre is mounted is changed from that used in the first series of measurements. The average tilt of each fin of each tyre Pi in this second series of measurements is equal to an angle αB such that αB=α1,i−α2. By a procedure similar to that of the first series of measurements, the variation of the gain in drag coefficient is found as a function of the angle α1 (the curve shown in broken lines).

The angular interval between the two curves for ΔCx=0 is then determined. The angular interval corresponds to the difference between αA and αB, i.e. 2*α2. From this, α2 can then be deduced.

Figure 6:
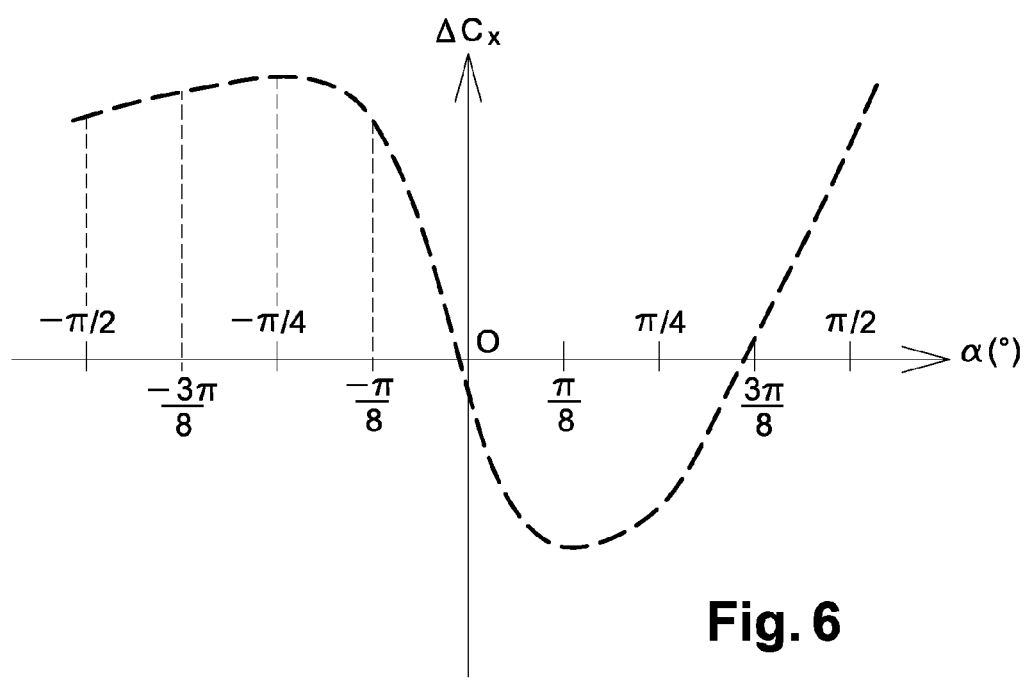
FIG. 6 shows a curve of variation of the difference between the drag coefficient of a vehicle fitted with a tyre without fins and the drag coefficient of a vehicle fitted with the tyre of FIG. 1, as a function of the average tilt of the projection.

FIG. 6 shows a curve which can be used to determine the gain in drag coefficient ΔCx=Cx−Cx,0 of a vehicle as a function of the angle α corresponding to the average tilt, where Cx is the drag coefficient of a vehicle fitted with tyres according to the first embodiment and Cx,0 is the drag coefficient of a vehicle fitted with similar tyres having no fins. The fins 16 serve to modify the air flow locally around the tyre 10 so as to modify the air flow around the vehicle. Since the angle α is counted positively in the direction of rotation of the tyre 10, starting from the reference line R, an angle α having a value within the range [0, 3π/8] serves to reduce the drag coefficient Cx of the vehicle and consequently the resistance of the vehicle to forward motion. This is because, as shown in FIG. 6, for this angle α the drag coefficient Cx of a vehicle fitted with tyres according to the first embodiment is smaller than the drag coefficient Cx,0 of a vehicle fitted with similar tyres having no fins.

The angle α belongs, preferably, to the range [π/12, π/4] and, very preferably, to the range [π/8, π/4]. This range enables a minimum value of the drag coefficient Cx to be obtained.

In a variant, the angle α belongs to the range [−π/2, 0[, preferably [−3π/8, −π/8], and very preferably [−π/4, −π/8]. These ranges enable a maximum value of the drag coefficient Cx to be obtained.

Figure 7:
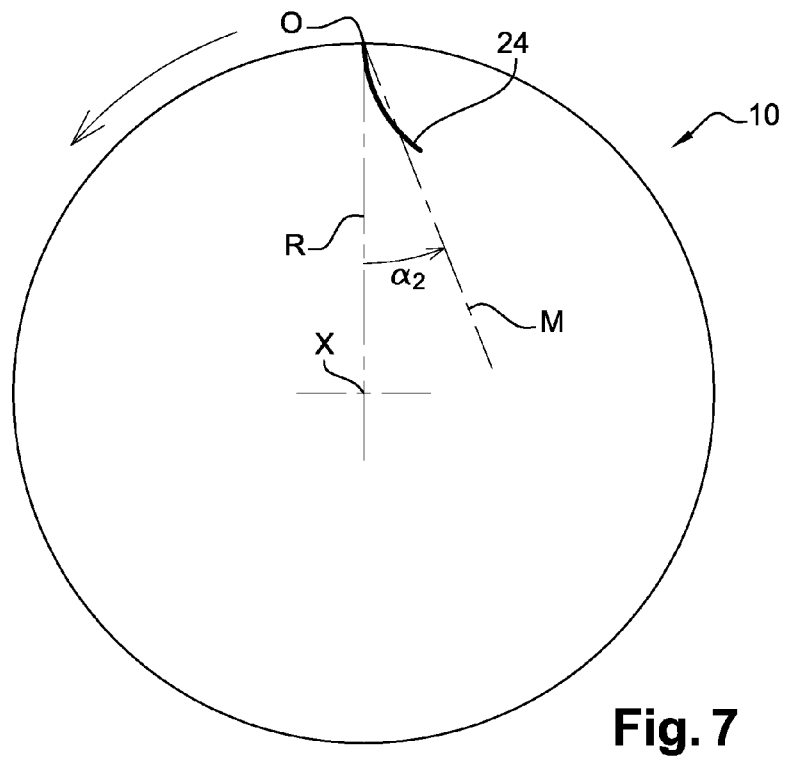
FIGS. 7 and 8 are views similar to that of FIG. 3, showing, respectively, tyres according to the second and third embodiments of the invention.
Figure 8:
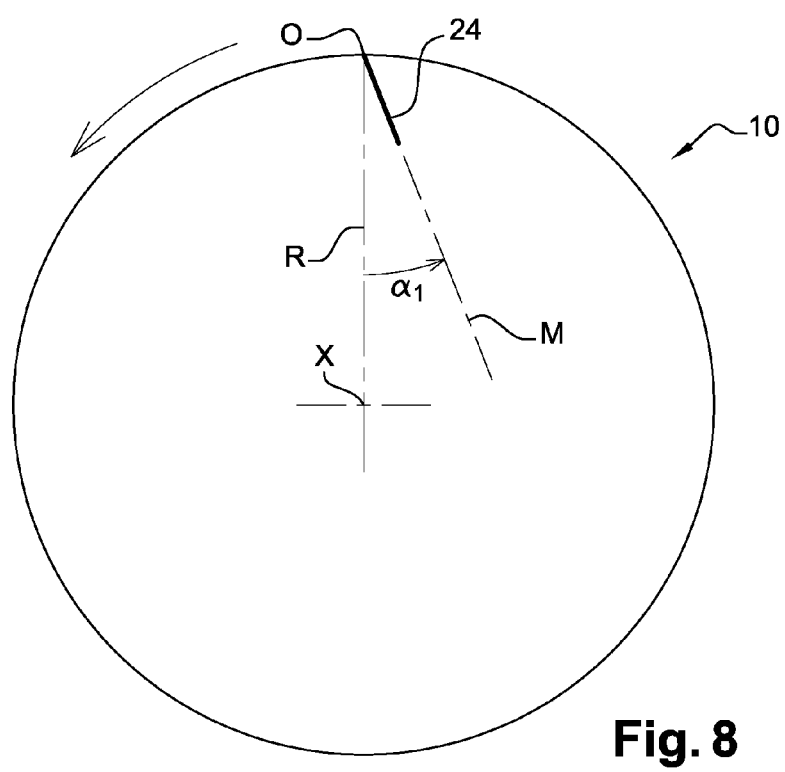

FIGS. 7 and 8 show projections of tyres according to second and third embodiments of the invention. Elements similar to those shown in the preceding figures are indicated by identical references.

By contrast with the tyre 10 according to the first embodiment, the average tilt of the projection 24 of the tyre of FIG. 7 is equal to the average tilt in relation to the curvature. This is because the projection 24 is substantially parallel to the straight line R at the origin O. In other words, α=α2 and α1=0.

By contrast with the tyre 10 according to the first embodiment, the average tilt of the projection 24 of the tyre of FIG. 8 is equal to the average tilt in relation to the inclination. Thus the projection 24 is substantially rectilinear. In other words, α=α1 and α2=0.

Figure 9:
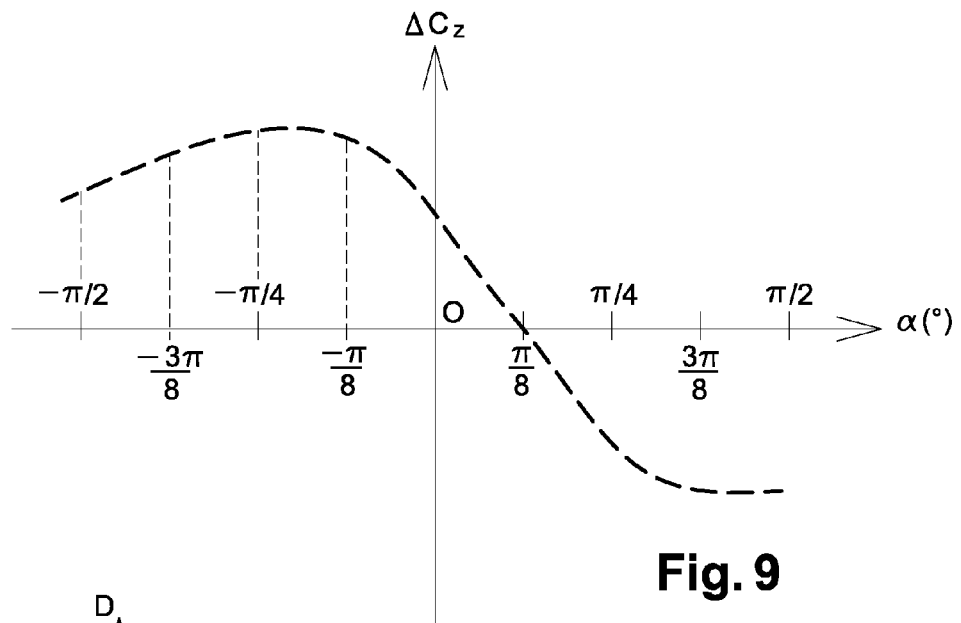
FIG. 9 shows a curve of variation of the difference between the drag coefficient of a vehicle fitted with a similar tyre without fins and the drag coefficient of a vehicle fitted with a tyre according to a fourth embodiment, as a function of the average tilt of the projection.

FIG. 9 shows a curve which can be used to determine the gain in lift coefficient ΔCz=Cz−Cz,0 as a function of the angle α corresponding to the average tilt, where Cz is the lift coefficient of a vehicle fitted with tyres according to a fourth embodiment and Cz,0 is the lift coefficient of a vehicle fitted with similar tyres having no fins.

The fins 16 serve to modify the air flow locally around the tyre 10 so as to modify the air flow around the vehicle. Since the angle α is counted positively in the direction of rotation of the tyre 10, starting from the reference line R, an angle α having a value belonging to the range [π/8, π/2] serves to reduce the lift coefficient Cz of the vehicle and thus to increase the pressure of the vehicle on the road. This is because, as shown in FIG. 9, for this angle α the lift coefficient Cz of a vehicle fitted with tyres according to the fourth embodiment is smaller than the lift coefficient Cz,0 of a vehicle fitted with similar tyres having no fins.

The angle α belongs, preferably, to the range [π/4, π/2], and more preferably to the range [3π/8, π/2]. These ranges enable a minimum value of the lift coefficient Cz to be obtained.

In a variant, the angle α belongs to the range [−π/2, −π/8[, preferably [−3π/8, 0] or [−3π/8, −π/12], and very preferably [−π/4, −π/8]. These ranges enable a maximum value of the lift coefficient Cz to be obtained.

Figure 10:
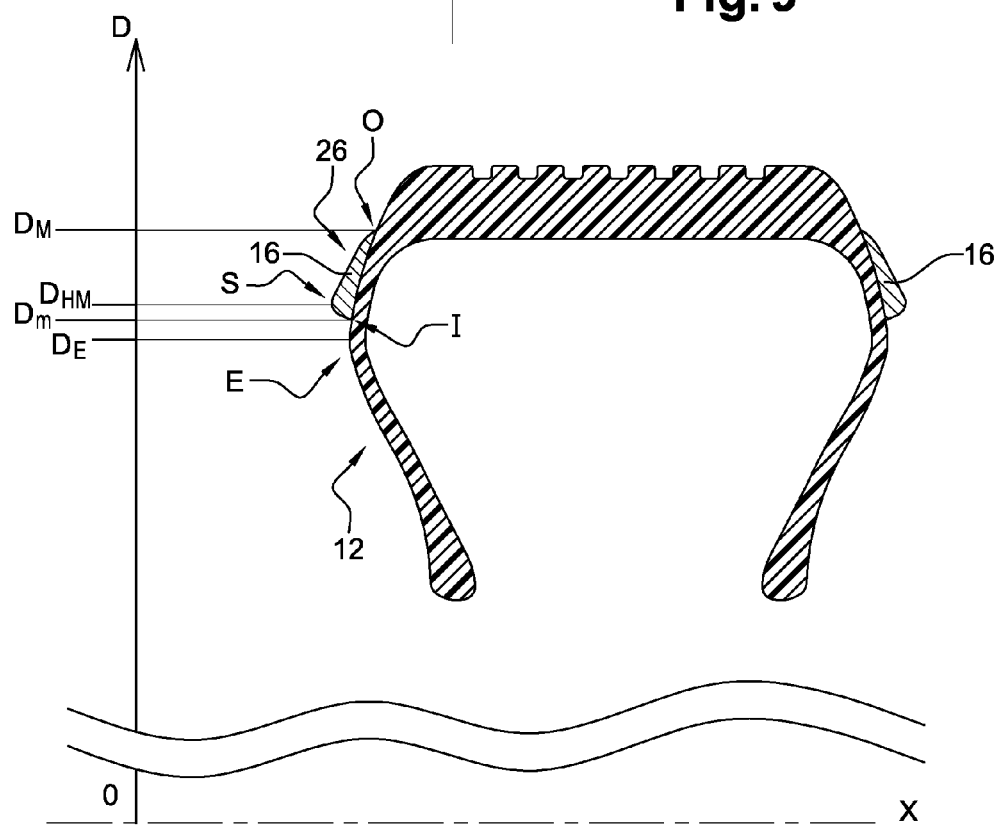
FIG. 10 shows an axial section through a tyre, in an axial plane passing substantially through the middle of a fin, with a slightly modified representation of the projection of the contour of the free edge of the fin.

FIG. 10 shows an axial section through a tyre, in an axial plane passing substantially through the middle of a fin, with a slightly modified representation of the projection of the contour 26 of the free edge of the fin 16. The representation of this contour 26 of the fin is very slightly deformed by comparison with a conventional projection, because the fin does not extend in the projection plane: in fact, each point of the contour of the fin is shown exactly at its real distance from the axis of revolution X of the tyre, with the real height of the fin corresponding to this distance.

The fin therefore starts from the origin point O, at a distance $D_M$ from the axis X. Its height increases continuously to a point of maximum height or top S of the fin, located at a distance $D_{HM}$ from the axis X, then decreases rapidly until it reaches a value of 0 at the end I of the fin, corresponding to the distance $D_m$ from the axis X. At the end I, the contour has a taper angle, for example an angle in the range from 4° to 35° with respect to a line perpendicular to the sidewall of the tyre, which allows easy removal from the mould when the fin is made from the same piece of material as the tyre.

As shown in FIG. 10, the value of $D_{HM}$ is much closer to that of $D_m$ than to that of $D_M$. In other words, the top S of the fin is much closer to the end I of the fin than to its origin O.

Furthermore, the fin is located near the tread of the tyre, above an "equatorial" point E of the tyre, in other words a point on the sidewall corresponding to a maximum width. Thus the fin of FIG. 12 extends in a shaped way in the area between the tread and the equatorial area of the tyre.

The invention is not limited to the embodiments described above.

Indeed, the characteristics of the different embodiments may be combined, to the extent that they are compatible with each other.

In particular, it is possible to provide a tyre which serves both to modify the resistance of the vehicle to forward motion and its pressure on the road, according to the particular requirements of a vehicle manufacturer or of a user of the vehicle.

The invention claimed is:

1. A tyre for a road vehicle, the tyre having a predetermined direction of rotation, the tyre comprising a plurality of fins for modifying one of: a drag of the vehicle and a lift of the vehicle, wherein:
   the fins are arranged on a sidewall of the tyre,
   a group G of the fins includes at least 60% of the fins, wherein:
      each fin of the group G includes a junction with the sidewall,
      for each junction, a projection of the junction in a projection plane perpendicular to an axis of revolution of the tyre is substantially curved, and has an origin at a radially outer end,
      each fin is arranged to form, in the projection plane, an angle α between:

a reference line, which is a straight line passing through the origin and the axis of revolution of the tyre, and a straight line representing an average tilt of the projection of the junction and passing through the origin, the average tilt includes:

an average tilt in relation to an inclination of the projection of the junction at the origin, equal to an angle α1 between the reference line and a tangent to the projection of the junction at the origin, and an average tilt in relation to a curvature of the projection of the junction, equal to an angle α2 between the tangent to the projection of the junction at the origin and an average line, which is a straight line passing through the origin, the average line and the projection of the junction crossing each other at an intersection point, wherein the projection of the junction includes a first portion lying between the origin and the intersection point and a second portion lying between the intersection point and a radially inner end of the projection of the junction, and wherein the average line includes a first portion lying between the origin and the intersection point and a second portion lying between the intersection point and an orthogonal projection of a radially inner end on the average line, the average line being such that areas lying between, respectively, the first portions and the second portions of the projection of the junction and the average line are substantially equal, the angle α being counted positively in the direction of rotation of the tyre, starting from the reference line, such that:

to increase the drag or the lift of the vehicle, the angle α has a value belonging to a predetermined domain formed by a range $[-3\pi/8, -\pi/12]$, and, to reduce the drag or the lift of the vehicle, the angle α has a value belonging to a predetermined domain formed by a range $[+\pi/12, +\pi/4]$, and each fin extends within a range $]D_m, D_M[$ of distances from the axis of revolution of the tyre, a height of the fin varying continuously as a function of distance from the axis of revolution of the tyre, with every point of maximum height of the fin with respect to the sidewall of the tyre being at a distance from the axis of revolution of the tyre that is less than or equal to $D_m + 0.40(D_M - D_m)$.

2. The tyre according to claim 1, wherein, for each fin of the group G, to increase the drag or the lift of the vehicle, the value of the angle α belongs to a domain formed by a range $[-3\pi/8, -\pi/8]$.

3. The tyre according to claim 1, wherein, for each fin of the group G, to increase the drag of the vehicle, the value of the angle α belongs to a domain formed by a range $[-\pi/4, -\pi/8]$, and, to reduce the drag of the vehicle, the value of the angle α belongs to a domain formed by a range $[+\pi/8, +\pi/4]$.

4. The tyre according to claim 1, wherein, for each fin of the group G, the value of the angle α belongs to a domain formed by a range $[+\pi/8, +\pi/4]$.

5. The tyre according to claim 1, wherein, for each fin of the group G, to increase the lift of the vehicle, the value of the angle α belongs to a domain formed by a range $[-3\pi/8, -\pi/12]$.

6. The tyre according to claim 1, wherein, for each fin of the group G, between a point of the fin located substantially at a maximum distance $D_M$ from the axis of revolution of the tyre and at least one point of maximum height of the fin, a height of the fin increases constantly over at least 50% of the range $]D_m, D_M[$ of distances from the axis of revolution of the tyre.

7. The tyre according to claim 2, wherein, for each fin of the group G, between a point of the fin located substantially at a maximum distance $D_M$ from the axis of revolution of the tyre and at least one point of maximum height of the fin, a height of the fin increases constantly over at least 50% of the range $]D_m, D_M[$ of distances from the axis of revolution of the tyre.

8. The tyre according to claim 3, wherein, for each fin of the group G, between a point of the fin located substantially at a maximum distance $D_M$ from the axis of revolution of the tyre and at least one point of maximum height of the fin, a height of the fin increases constantly over at least 50% of the range $]D_m, D_M[$ of distances from the axis of revolution of the tyre.

9. The tyre according to claim 4, wherein, for each fin of the group G, between a point of the fin located substantially at a maximum distance $D_M$ from the axis of revolution of the tyre and at least one point of maximum height of the fin, a height of the fin increases constantly over at least 50% of the range $]D_m, D_M[$ of distances from the axis of revolution of the tyre.

10. The tyre according to claim 5, wherein, for each fin of the group G, between a point of the fin located substantially at a maximum distance $D_M$ from the axis of revolution of the tyre and at least one point of maximum height of the fin, a height of the fin increases constantly over at least 50% of the range $]D_m, D_M[$ of distances from the axis of revolution of the tyre.

11. The tyre according to claim 1, wherein a position of any point of maximum width of the tyre is located at a distance from the axis of revolution of the tyre that is less than $D_M - 0.30(D_M - D_m)$.

12. The tyre according to claim 1, wherein, for each fin of the group G, the fin does not include any point having a same circumferential angular position as any point of another fin located on the sidewall of the tyre, in projection on the projection plane perpendicular to the axis of revolution of the tyre.

13. The tyre according to claim 1, wherein a number of fins arranged on the sidewall is in a range from 10 to 28, with each fin belonging to the group G.

14. The tyre according to claim 1, wherein each fin of the group G does not form a cavity.

15. The tyre according to claim 1, further comprising reinforcing threads that operate in a pressure range from 0.12 MPa to 1.0 MPa.

16. The tyre according to claim 1, further comprising a mark indicating the predetermined direction of rotation.

17. The tyre according to claim 1, wherein α2≠0.

18. The tyre according to claim 1, wherein α1≠0 and α2≠0.

19. A road vehicle, comprising at least one tyre mounted thereon, each tyre having a predetermined direction of rotation, and each tyre including a plurality of fins for modifying at least one of: a drag of the vehicle and a lift of the vehicle, wherein:

the fins are arranged on a sidewall of the tyre,
a group G of the fins includes at least 60% of the fins, wherein:
- each fin of the group G includes a junction with the sidewall,
- for each junction, a projection of the junction in a projection plane perpendicular to an axis of revolution of the tyre is substantially curved, and has an origin at a radially outer end,
- each fin is arranged to form, in the projection plane, an angle $\alpha$ between:
  - a reference line, which is a straight line passing through the origin and the axis of revolution of the tyre, and
  - a straight line representing an average tilt of the projection of the junction and passing through the origin,
- the average tilt includes:
  - an average tilt in relation to an inclination of the projection of the junction at the origin, equal to an angle $\alpha 1$ between the reference line and a tangent to the projection of the junction at the origin, and
  - an average tilt in relation to a curvature of the projection of the junction, equal to an angle $\alpha 2$ between the tangent to the projection of the junction at the origin and an average line, which is a straight line passing through the origin, the average line and the projection of the junction crossing each other at an intersection point,
- wherein the projection of the junction includes a first portion lying between the origin and the intersection point and a second portion lying between the intersection point and a radially inner end of the projection of the junction, and
- wherein the average line includes a first portion lying between the origin and the intersection point and a second portion lying between the intersection point and an orthogonal projection of a radially inner end on the average line, the average line being such that areas lying between, respectively, the first portions and the second portions of the projection of the junction and the average line are substantially equal, the angle $\alpha$ being counted positively in the direction of rotation of the tyre, starting from the reference line, such that:
  - to increase the drag or the lift of the vehicle, the angle $\alpha$ has a value belonging to a predetermined domain formed by a range $[-3\pi/8, -\pi/12]$, and,
  - to reduce the drag or the lift of the vehicle, the angle $\alpha$ has a value belonging to a predetermined domain formed by a range $[+\pi/12, +\pi/4]$, and
- each fin extends within a range $]D_m, D_M[$ of distances from the axis of revolution of the tyre, a height of the fin varying continuously as a function of distance from the axis of revolution of the tyre, with every point of maximum height of the fin with respect to the sidewall of the tyre being at a distance from the axis of revolution of the tyre that is less than or equal to $D_m+0.40 (D_M-D_m)$.

20. A method for modifying a drag coefficient, or a lift coefficient, or both a drag coefficient and a lift coefficient of a vehicle, the method comprising a step of utilizing, on the vehicle, at least one tyre having a predetermined direction of rotation, each tyre including a plurality of fins for modifying at least one of: a drag of the vehicle and a lift of the vehicle, wherein:
- the fins are arranged on a sidewall of the tyre,
- a group G of the fins includes at least 60% of the fins, wherein:
  - each fin of the group G includes a junction with the sidewall,
  - for each junction, a projection of the junction in a projection plane perpendicular to an axis of revolution of the tyre is substantially curved, and has an origin at a radially outer end,
  - each fin is arranged to form, in the projection plane, an angle $\alpha$ between:
    - a reference line, which is a straight line passing through the origin and the axis of revolution of the tyre, and
    - a straight line representing an average tilt of the projection of the junction and passing through the origin,
  - the average tilt includes:
    - an average tilt in relation to an inclination of the projection of the junction at the origin, equal to an angle $\alpha 1$ between the reference line and a tangent to the projection of the junction at the origin, and
    - an average tilt in relation to a curvature of the projection of the junction, equal to an angle $\alpha 2$ between the tangent to the projection of the junction at the origin and an average line, which is a straight line passing through the origin, the average line and the projection of the junction crossing each other at an intersection point,
  - wherein the projection of the junction includes a first portion lying between the origin and the intersection point and a second portion lying between the intersection point and a radially inner end of the projection of the junction, and
  - wherein the average line includes a first portion lying between the origin and the intersection point and a second portion lying between the intersection point and an orthogonal projection of a radially inner end on the average line, the average line being such that areas lying between, respectively, the first portions and the second portions of the projection of the junction and the average line are substantially equal, the angle $\alpha$ being counted positively in the direction of rotation of the tyre, starting from the reference line, such that:
    - to increase the drag or the lift of the vehicle, the angle $\alpha$ has a value belonging to a predetermined domain formed by a range $[-3\pi/8, -\pi/12]$, and,
    - to reduce the drag or the lift of the vehicle, the angle $\alpha$ has a value belonging to a predetermined domain formed by a range $[+\pi/12, +\pi/4]$, and
- each fin extends within a range $]D_m, D_M[$ of distances from the axis of revolution of the tyre, a height of the fin varying continuously as a function of distance from the axis of revolution of the tyre, with every point of maximum height of the fin with respect to the sidewall of the tyre being at a distance from the axis of revolution of the tyre that is less than or equal to $D_m+0.40 (D_M-D_m)$.

21. The method according to claim 20, wherein the method reduces a drag coefficient of the vehicle.

22. The method according to claim 20, wherein the method reduces a lift coefficient of the vehicle.

23. The method according to claim 21, wherein the method reduces a lift coefficient of the vehicle.

\* \* \* \* \*